Jan. 14, 1930.  W. C. HAMMOND ET AL  1,743,134
MOTOR DRIVEN MACHINE
Filed Nov. 11, 1926

INVENTOR
William C. Hammond
Henry J. Kingsbury
BY
ATTORNEYS

Patented Jan. 14, 1930

1,743,134

UNITED STATES PATENT OFFICE

WILLIAM C. HAMMOND AND HENRY J. KINGSBURY, OF KALAMAZOO, MICHIGAN, ASSIGNORS TO HILL-CURTIS COMPANY, OF KALAMAZOO, MICHIGAN

MOTOR-DRIVEN MACHINE

Application filed November 11, 1926. Serial No. 147,743.

Our improvements relate particularly to electric motor driven grinding and polishing machines, although desirable for embodiment in other motor driven machines, particularly those used in shops where the air is likely to be laden with dust, grit and other machine refuse.

The main object of this invention is to provide a structure of this class in which the motor is air cooled, the air supplied to the motor being purified or filtered.

Objects pertaining to details and economies of construction and operation of our improvements will definitely appear from the detailed description to follow. The invention is clearly defined and poined out in the claims.

A structure embodying the features of our invention is clearly illustrated in the accompanying drawing forming a part of this application, in which.

Figure 1:
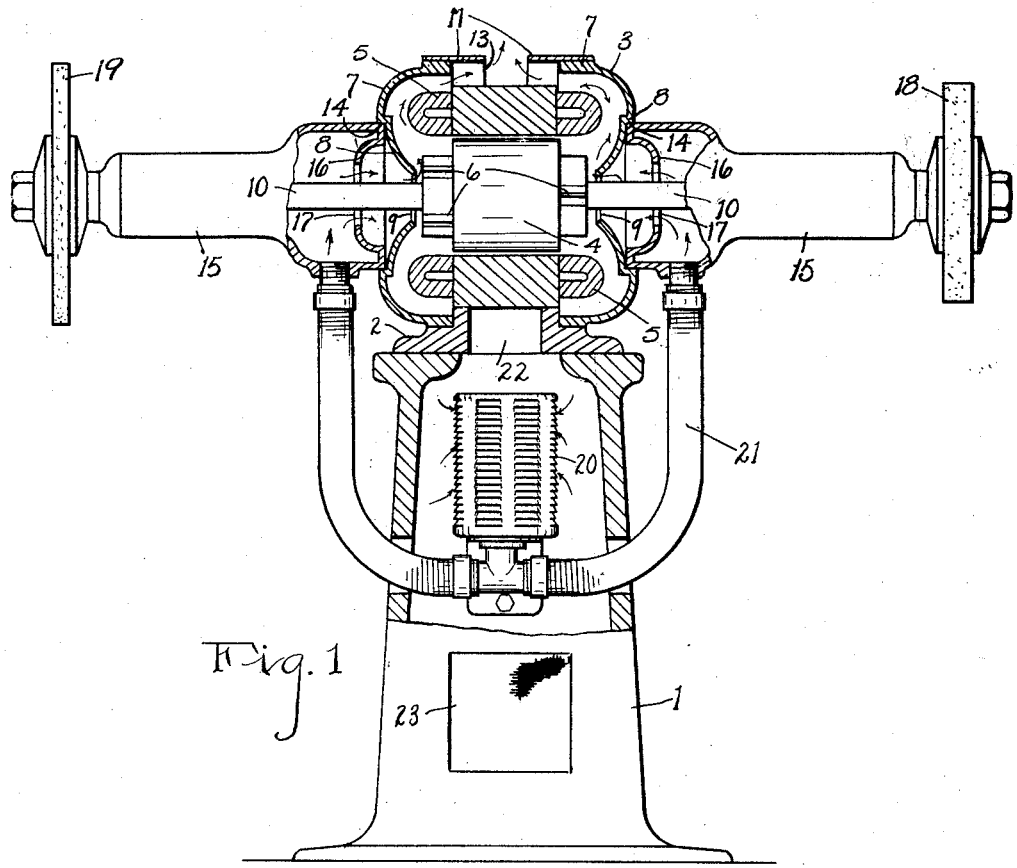
Fig. 1 is a side elevation of a grinding or polishing machine embodying the features of our invention partially in vertical central section.
Figure 2:
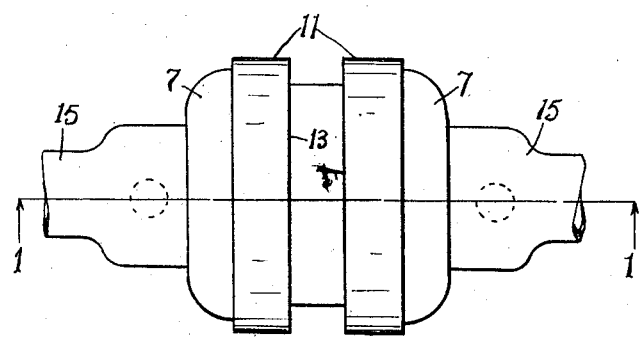
Fig. 2 is a fragmentary top view.

Referring to the drawing, the pedestal 1 is preferably chambered as illustrated. On this pedestal we mount a motor comprising a base 2, a housing 3 for the rotor 4, and windings 5, these parts being shown conventionally. The rotor is provided with fan blades 6 at each end.

The motor housing 3 is formed of two sections 7 having end walls 8, these end walls being converged inwardly and having central openings 9 to receive the shaft 10 of the rotor. The housing has peripheral sections 11 of sheet metal which are adjustable to and from each other to control the width of the central air discharge opening 13. The end walls of the housing have annular shoulders 14 receiving the ends of the shaft housings 15.

These shaft housings, in the embodiment illustrated, have inner end walls 16 with openings 17 therein through which the shafts project. The housings are provided with bearings for the shaft but as these details form no part of this invention, they are not illustrated herein.

Grinding or polishing wheels 18 and 19 are mounted on the shaft. Within the housing we mount an air filter 20 connected by the conduits 21 to the shaft housing so that the filtered air is delivered to the shaft housing and passes therethrough into the motor housing, the end walls of the motor housing being conformed so that the air is efficiently directed to the fans by which it is discharged around the motor windings and out through the opening 13. The pedestal is preferably provided with a screened opening 23 in its rear wall.

With the parts thus arranged they are effectively protected from grit and dust and the motor is properly cooled. The blast of air through the opening in the motor housing prevents the settling of dust therein, or, should dust settle through this opening, it only contacts with parts that are not likely to be injured thereby.

Having thus described our invention what we claim as new and desire to secure by Letters Patent is:

1. In a structure of the class described, the combinaton of a chambered pedestal, an electric motor mounted on said pedestal and comprising a rotor provided with fan blades at the ends thereof and with a shaft projecting at each end and a housing having a central peripheral air discharge opening and an air discharge opening communicating with the chamber of said pedestal, said housing having inwardly converged end walls provided with central openings therein to receive the motor shaft and direct the air to the said fan blades, the ends of the housing being shouldered to receive the ends of shaft housings, shaft housings seated in said shoulders and having openings in their inner ends to receive the shafts and to permit the passage of air around the same, an air filter within said pedestal, and conduits connected thereto and to said shaft housings to conduct the filtered air to the shaft housings.

2. In a structure of the class described, the combination of a chambered pedestal, an electric motor provided with fan blades at the ends thereof and with a shaft projecting at each end and a housing having a central peripheral air discharge opening and an air discharge opening communicating with the chamber of said pedestal, shaft housings mounted on said motor housing and communicating therewith, an air filter within said pedestal, and conduits connected thereto and to said shaft housngs to conduct the filtered air to the shaft housings.

3. In a structure of the class described, the combination of a chambered pedestal, an electric motor mounted on said pedestal and comprising a rotor provided with a fan and with a shaft projecting at each end and a housing having an air discharge opening, said housing having ends provided with central openings therein to receive the motor shaft and permit the passage of air, shaft housings mounted on the ends of said motor housing, an air filter within said pedestal, and conduits connected thereto and to said shaft housings to conduct the filtered air to the shaft housings.

4. In a structure of the class described, the combination of a chambered pedestal, an electric motor mounted on said pedestal and comprising a rotor provided with a fan and a housing having an air discharge opening, and an air filter within said pedestal connected to said motor housing to deliver filtered air thereto.

In witness whereof we have hereunto set our hands.

WILLIAM C. HAMMOND.
HENRY J. KINGSBURY.